United States Patent
Battenberg et al.

(10) Patent No.: US 10,657,955 B2
(45) Date of Patent: May 19, 2020

(54) SYSTEMS AND METHODS FOR PRINCIPLED BIAS REDUCTION IN PRODUCTION SPEECH MODELS

(71) Applicant: Baidu USA, LLC, Sunnyvale, CA (US)

(72) Inventors: Eric Battenberg, Sunnyvale, CA (US); Rewon Child, San Francisco, CA (US); Adam Coates, Mountain View, CA (US); Christopher Fougner, Palo Alto, CA (US); Yashesh Gaur, Santa Clara, CA (US); Jiaji Huang, San Jose, CA (US); Heewoo Jun, Sunnyvale, CA (US); Ajay Kannan, Mountain View, CA (US); Markus Kliegl, Santa Clara, CA (US); Atul Kumar, Campbell, CA (US); Hairong Liu, San Jose, CA (US); Vinay Rao, Mountain View, CA (US); Sanjeev Satheesh, Sunnyvale, CA (US); David Seetapun, Berkeley, CA (US); Anuroop Sriram, Sunnyvale, CA (US); Zhenyao Zhu, Sunnyvale, CA (US)

(73) Assignee: Baidu USA LLC, Sunnyvale, CA (US)

( * ) Notice: Subject to any disclaimer, the term of this patent is extended or adjusted under 35 U.S.C. 154(b) by 172 days.

(21) Appl. No.: 15/884,239

(22) Filed: Jan. 30, 2018

(65) Prior Publication Data
US 2018/0247643 A1 Aug. 30, 2018

Related U.S. Application Data

(60) Provisional application No. 62/463,547, filed on Feb. 24, 2017.

(51) Int. Cl.
*G10L 17/18* (2013.01)
*G10L 15/16* (2006.01)
(Continued)

(52) U.S. Cl.
CPC .............. *G10L 15/16* (2013.01); *G10L 15/02* (2013.01); *G10L 15/04* (2013.01); *G10L 15/22* (2013.01); *G10L 25/18* (2013.01)

(58) Field of Classification Search
CPC ....... G10L 15/16; G10L 15/02; G10L 15/063; G10L 15/183; G10L 17/14; G10L 15/14;
(Continued)

(56) References Cited

U.S. PATENT DOCUMENTS 9,786,270 B2 * 10/2017 Senior ................... G10L 15/063
9,818,409 B2 * 11/2017 Senior ................... G10L 17/14
(Continued)

OTHER PUBLICATIONS

Sak et al.,"Fast and accurate recurrent neural network acoustic models for speech recognition," abs/1507.06947, 2015. http://arxiv.org/abs/1507.06947. (5pgs) (Year: 2015).*
(Continued)

*Primary Examiner* — Vijay B Chawan
(74) *Attorney, Agent, or Firm* — North Weber & Baugh LLP

(57) ABSTRACT

Described herein are systems and methods to identify and address sources of bias in an end-to-end speech model. In one or more embodiments, the end-to-end model may be a recurrent neural network with two 2D-convolutional input layers, followed by multiple bidirectional recurrent layers and one fully connected layer before a softmax layer. In one or more embodiments, the network is trained end-to-end using the CTC loss function to directly predict sequences of characters from log spectrograms of audio. With optimized recurrent layers and training together with alignment information, some unwanted bias induced by using purely forward only recurrences may be removed in a deployed model.

20 Claims, 14 Drawing Sheets

(51) Int. Cl.
*G10L 15/04* (2013.01)
*G10L 15/22* (2006.01)
*G10L 15/02* (2006.01)
*G10L 25/18* (2013.01)

(58) Field of Classification Search
CPC ..... G10L 15/187; G10L 15/197; G10L 25/18;
G10L 25/21; G10L 15/1815; G10L 15/19;
G10L 15/22; G10L 15/32; G10L 19/038;
G10L 15/08; G10L 15/20; G10L 15/30;
G10L 19/008; G10L 21/007; G10L
21/028; G10L 21/0388; G10L 25/24;
G10L 25/30; G06N 3/0445; G06N 3/084;
G06N 7/005; G06N 20/10; G06N 3/0454;
G06N 5/022
USPC .............. 704/202, 232, 259, 275, 270.1, 270
See application file for complete search history.

(56) References Cited

U.S. PATENT DOCUMENTS

| | | | | |
|---|---|---|---|---|
| 9,818,410 | B2 * | 11/2017 | Sak | G10L 17/14 |
| 10,170,114 | B2 * | 1/2019 | Printz | G10L 15/19 |
| 10,176,802 | B1 * | 1/2019 | Ladhak | G10L 15/16 |
| 10,176,819 | B2 * | 1/2019 | Sun | G10L 15/08 |
| 10,210,862 | B1 * | 2/2019 | Ladhak | G10L 15/16 |
| 10,224,058 | B2 * | 3/2019 | Variani | G10L 25/30 |
| 10,229,672 | B1 * | 3/2019 | Rao | G10L 15/16 |
| 10,319,374 | B2 * | 6/2019 | Catanzaro | G10L 15/02 |
| 10,332,509 | B2 * | 6/2019 | Catanzaro | G10L 15/02 |
| 2016/0372118 | A1 * | 12/2016 | Senior | G10L 17/14 |
| 2016/0372119 | A1 * | 12/2016 | Sak | G10L 17/14 |
| 2017/0103752 | A1 * | 4/2017 | Senior | G10L 15/16 |
| 2017/0109355 | A1 * | 4/2017 | Li | G06N 7/005 |
| 2017/0148433 | A1 * | 5/2017 | Catanzaro | G10L 15/02 |
| 2018/0011688 | A1 * | 1/2018 | Wei | G06F 3/167 |
| 2018/0068661 | A1 * | 3/2018 | Printz | G10L 15/19 |

OTHER PUBLICATIONS

Xiong et al.,"Achieving human parity in conversational speech recognition," arXiv preprint arXiv:1610.05256, 2016. (12 pgs). (Year: 2016).*
Lu et al.,"Segmental recurrent neural networks for end-to-end speech recognition," In Interspeech, 2016. (5pgs).
Povey et al.,"Purely sequence-trained neural networks for asr based on lattice-free mmi," in Interspeech, 2016. (5 pgs).
Porter et al.,"Optimal estimators for spectral restoration of noisy speech," In Acoustics, Speech, & Signal Processing, IEEE Intr. Conference on ICASSP 1984. (2 pgs).
Cho et al.,"Neural machine translation by jointly learning to align and translate," abs/1409.0473, 2014. http://arxiv.org/abs/1409.0473. (15 pgs).
Ioffe & Szegedy,"Batch normalization: Accelerating deep network training by reducing internal covariate shift," arXiv preprint arXiv:1502.03167, 2015. (10 pgs).
He et al.,"Deep residual learning for image recognition," arXiv preprint arXiv:1512.03385, 2015. (12 pgs).
Lei Ba et al.,"Layer Normalization," arXiv preprint arXiv:1607.06450,2016. (14pgs).
Cooijmans et al.,"Recurrent batch normalization," arXiv preprint arXiv:1603.09025, 2016. (10 pgs).
Arpit et al.,"Normalization propagation: A parametric technique for removing internal covariate shift in deep networks," arXiv preprint arXiv:1603.01431, 2016. (11 pgs).

Schuster et al.," Bidirectional recurrent neural networks," IEEE Transactions on Signal Processing, 45(11):2673-2681, 1997. (9pgs).
Xiong et al.,"Achieving human parity in conversational speech recognition," arXiv preprint arXiv:1610.05256, 2016. (12 pgs).
Amodei et al.,"Deep speech 2: End-to-End speech recognition in English and Mandarin," arXiv preprint arXiv:1512.02595, 2015. (28pgs).
Graves et al., "Connectionist Temporal Classification: Labelling Unsegmented Sequence Data with Recurrent Neural Networks," In Proceedings of the 23rd international conference on Machine learning, 2006. (8 pgs).
Wang et al.,"Trainable frontend for robust and far-field keyword spotting," arXiv preprint arXiv:1607.05666, 2016. (5pgs).
Sercu & Goel,"Dense prediction on sequences with time-dilated convolutions for speech recognition," arXiv preprint arXiv:1611.09288, 2016. (5pgs).
Peddinti et al.,"A time delay neural network architecture for efficient modeling of long temporal contexts," In Interspeech, pp. 3214-3218, 2015. (5pgs).
Zhang et al.,"Highway long short-term memory rnns for distant speech recognition," in ICASSSP, 2016. (5pgs).
Liu et al.,"Gram-CTC: Automatic unit selection and target decomposition for sequence labelling," arXiv preprint arXiv:1703.00096, 2017. (10 pgs).
Sak et al.,"Fast and accurate recurrent neural network acoustic models for speech recognition," abs/1507.06947, 2015. http://arxiv.org/abs/1507.06947. (5pgs).
Sainath et al.,"Learning the speech frontend with raw waveform cldnns," In Interspeech, 2015. (5pgs).
Zhu et al.,"Learning multiscale features directly from waveforms," In Interspeech, 2016. (5 pgs).
Wang et al.,"Lookahead convlution layer for unidirectional recurrent neural networks," [online], Retrieved from Internet <URL: http://www.cs.cmu.edu/~dyogatam/papers/wangetal.iclrworkshop2016.pdf> 2016 (4pgs).
Chen et al.,"Training deep bidirectional lstm acoustic model for lvcsr by a context-sensitivechunk bptt approach," IEEE/ACM Transactions on Audio,Speech, and Language Processing, 2016. (3 pgs).
Bahdanau et al.,"Neural machine translation by jointly learning to align and translate," arXiv preprint arXiv:1409.0473, 2015. (15pgs).
Chan et al.,"Listen, attend and spell: A neural network for large vocabulary conversational speech recognition," In 2016 IEEE International Conference on Acoustics, Speech & Signal Processing (ICASSP), 2016. (3pgs).
Collobert et al., Wav2letter: an end-to-end convNet-based speech recognition system, arXiv preprint arXiv:1609.03193, 2016. (8pgs).
Ko et al.,"A study on data augmentation of reverberant speech for robust speech recognition," ICASSP 2017 (submitted), 2017. (5 pgs).
Lieberman et al.,"How to wreck a nice beach you sing calm incense," Proceedings of the 10th intenational confrencce in Intelligent user interface, ACM, 2005. (2pgs).
Liu, Hairong et al.,"Gram-CTC: Automatic Unit Selection and Target Decomposition for Sequence Labelling," arXiv preprint arXiv:1703.00096, 2017 (10 pgs).
Chen et al.,"Training deep bidirectional LSTM acoustic model for LVCSR by a context-sensitive-chunk BPTT approach," IEEE/ACM Transactions on Audio, Speech & Language Processing (TASLP) 2016. (2pgs).
Zhang et al.,"Highway long short-term memory RNNS for distant speech recognition," Acoustics, Speech & Processing (ICASSP), 2016 IEEE Intrn. Conf. on IEEE, 2016. (5pgs).
Zhang et al.,"Highway long short-term memory RNNS for distant speech recognition," arXiv preprint arXiv:1510.08983, 2016. (5pgs).
Chen et al.,"Training Deep Bidirectional LSTM Acoustic Model for LVCSR by a Context-Sensitive-Chunk BPTT Approach," In Interspeech, 2015. (5pgs).

* cited by examiner

Homogeneous speech dataset

Real world speech dataset

405: Bidirectional RNN
410: Chunked RNN
415: Chunked RNN with overlapping
420: LC-BGRU layer
425: Lookahead Convolution

SYSTEMS AND METHODS FOR PRINCIPLED BIAS REDUCTION IN PRODUCTION SPEECH MODELS

CROSS-REFERENCE To RELATED APPLICATION

This application claims the priority benefit under 35 USC § 119(e) to U.S. Provisional Patent Application No. 62/463,547, filed on 24 Feb. 2017, entitled "PRINCIPLED BIAS REDUCTION IN PRODUCTION SPEECH MODELS", and listing Adam Coates, Jiaji Huang, Hairong Liu, Zhenyao Zhu, Rewon Child, Eric Battenberg, Heewoo Jun, Anuroop Sriram, Vinay Rao, Sanjeev Satheesh, and Atul Kumar as inventors. The aforementioned patent document is incorporated by reference herein in its entirety.

BACKGROUND OF THE INVENTION

A. Technical Field

The present disclosure relates generally to systems and methods for computer learning that can provide improved computer performance, features, and uses.

B. Background

End-to-end trained speech models have achieved state of the art recently. However, low latency transcription imposes constraints on the model that puts end-to-end models back in the high bias regime. It is desirable to identify and address sources of bias in the system, and therefore to cover much of the gap from non-productionizable models.

Accordingly, what is needed are systems and methods for end-to-end speech model with reduced bias.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments. Items in the figures are not to scale.

DETAILED DESCRIPTION OF EMBODIMENTS

Figure 1A:
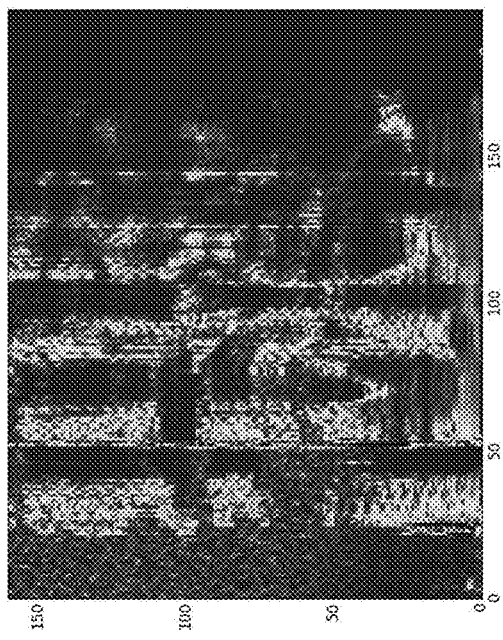
FIG. 1 depicts spectrograms of a same audio segment post-processed with FIG. 1A, FIG. 1B, FIG. 1C, and FIG. 1D corresponding to two different methods, according to embodiments of the present document.
Figure 1B:
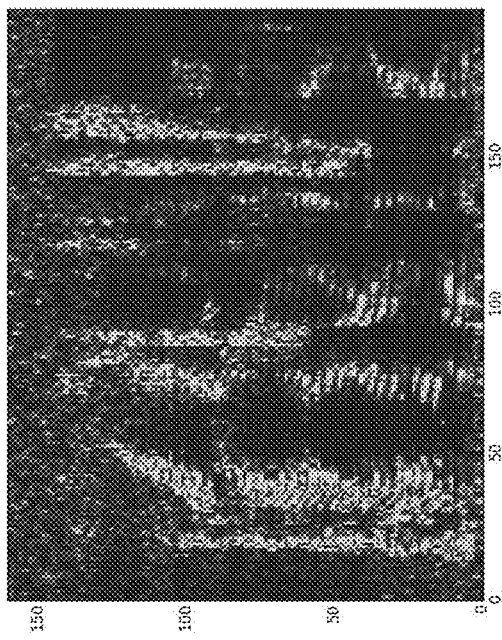

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components, or modules, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated.

The terms "include," "including," "comprise," and "comprising" shall be understood to be open terms and any lists the follow are examples and not meant to be limited to the listed items. Any headings used herein are for organizational purposes only and shall not be used to limit the scope of the description or the claims. Each reference mentioned in this patent document is incorporate by reference herein in its entirety.

Furthermore, one skilled in the art shall recognize that: (1) certain steps may optionally be performed; (2) steps may not be limited to the specific order set forth herein; (3) certain steps may be performed in different orders; and (4) certain steps may be done concurrently.

It shall be noted that any experiments and results presented herein are provided by way of illustration and were performed under specific conditions using a specific embodiment or embodiments; accordingly, neither these experiments nor their results shall be used to limit the scope of the disclosure of the current patent document.

A. Introduction

Deep learning has helped speech systems attain very strong results on speech recognition tasks for multiple languages. One could say therefore that the automatic speech recognition (ASR) task may be considered 'solved' for any domain where there is enough training data. However, production requirements such as supporting streaming inference bring in constraints that dramatically degrade the performance of such models—typically because models trained under these constraints are in the underfitting regime and can no longer fit the training data as well. Underfitting is the first symptom of a model with high bias. In this document, it is aimed to build deployable model architecture with low bias because: 1) it allows to serve the very best speech models and 2) identify better architectures to improve generalization performance, by adding more data and parameters.

Typically, bias is induced by the assumptions made in hand engineered features or workflows, by using surrogate loss functions (or assumptions they make) that are different from the final metric, or maybe even implicit in the layers used in the model. Sometimes, optimization issues may also prevent the model from fitting the training data as well—this effect is difficult to distinguish from underfitting. In this document, various approaches to resolve optimization issues are explored.

Sources of Bias in Production Speech Models

Figure 1C:
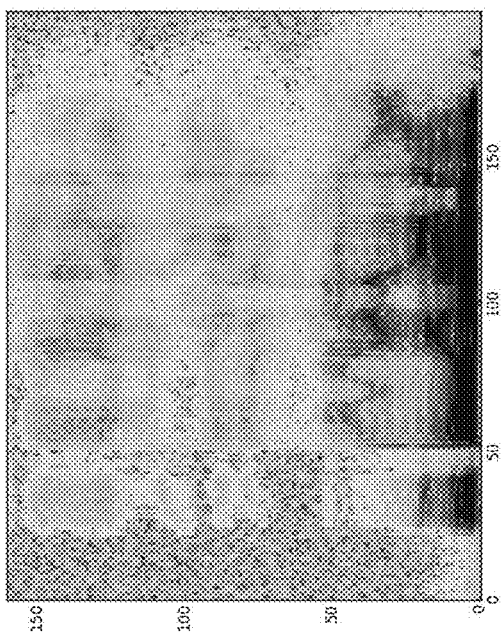
Figure 1D:
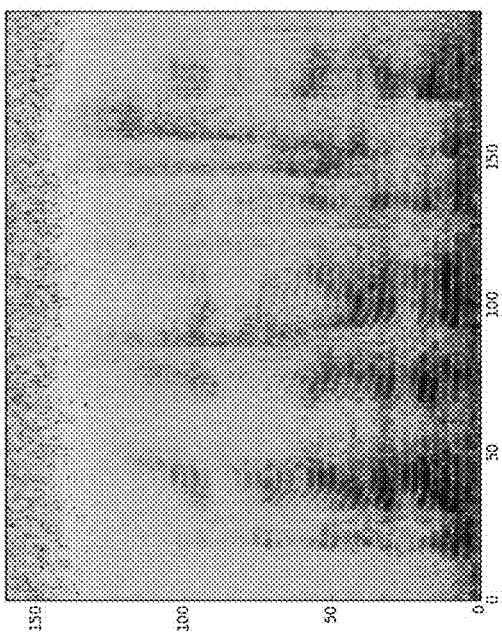

End-to-end models typically tend to have a lower bias because they have fewer hand engineered features. Therefore, a similar model is used in this disclosure as a baseline to start. In embodiments, the model is a recurrent neural network with two 2D-convolutional input layers, followed by multiple bidirectional recurrent layers (unidirectional for low latency ASR) and one fully connected layer before a softmax layer. In embodiments, the network is trained end-to-end using the Connectionist Temporal Classification (CTC) loss function, to directly predict sequences of characters from log spectrograms of audio. The following assumptions are implicit, that contribute to the bias of the model:

1. Input Modeling:

Typically, incoming audio is processed using energy normalization, spectrogram featurization, log compression, and finally, feature-wise mean and variance normalization. FIG. 1 depicts spectrograms of a same audio segment post-processed with different methods according to embodiments of the present document. In FIG. 1, each row shows spectrograms of the same audio segment post-processed with two different methods. The horizontal axis is time (10 millisecond (ms)/step) and the vertical axis is frequency bins. The left column (FIG. 1A and FIG. 1C) is generated by applying log. The right column (FIG. 1B and FIG. 1D) is with per-channel energy normalization (PCEN) with 0.015 and 0.08 smoothing coefficients. FIG. 1 shows that log spectrograms can have a high dynamic range across frequency bands (FIG. 1A) or have some bands missing (FIG. 1C). In embodiments, the disclosure investigates how the PCEN layer can parametrize and learn improved versions from these transformations, which simplifies the task of subsequent 2D convolutional layers.

2. Architectures for Streaming Inference:

English ASR models greatly benefit from using information from a few time frames into the future. In embodiments, in the baseline model, this is enabled by using bidirectional layers, which are impossible to deploy in a streaming fashion, because the backward looking recurrences can be computed only after the entire input is available. Making the recurrences forward-only immediately removes this constraint and makes these models deployable, but also make the assumption that no future context is useful. In embodiments, this disclosure shows the effectiveness of Latency Constrained Bidirectional RNNs in controlling the latency while still being able to include future context.

3. Target Modeling:

CTC models that output characters assume conditional independence between predicted characters given the input features—while this approximation makes maximum likelihood training tractable, this induces a bias on English ASR models and imposes a ceiling on performance. While CTC can easily model commonly co-occurring n-grams together, it is impossible to give roughly equal probability to many possible spellings when transcribing unseen words, because the probability mass has to be distributed between multiple time steps, while assuming conditional independence. In embodiments, this disclosure shows how GramCTC finds the label space where this conditional independence is easier to manage.

4. Optimization Issues:

Additionally, the CTC loss is notoriously unstable, despite making sequence labeling tractable, since it is forcing the model to align the input and output sequences, as well as recognize output labels. Making the optimization stable can help learn a better model with the same number of parameters. In embodiments, this disclosure shows two effective ways of using alignment information to improve the rate of convergence of these models.

The rest of this document is organized as follows: Section B introduces some related work that address each of the issues out-lined above. Sections C, D, E, and F investigate solutions for addressing the corresponding issue, and study trade-offs in their application. In section G, the disclosure presents experiments showing the impact of each component independently, as well as the combination of all of them. Some results are also discussed in Section G.

B. Some Related Work

The most direct way to remove all bias in the input modeling is probably learning a sufficiently expressive model directly from raw waveforms by parameterizing and learning these transformations, as disclosed by Sainath et al., *Learning the speech front-end with raw waveform CLDNNs*, INTERSPEECH, 2015, and by Zhu et al., *Leaning multiscale features directly from waveforms*, INTERSPEECH, 2016. These works suggest that non-trivial improvement in accuracy purely from modeling the raw waveform is hard to obtain without a significant increase in the compute and memory requirements. Wang et al. (*Trainable frontend for robust and far-field keyword spotting*, arXiv:1607.05666, 2016a) introduced a trainable per-channel energy normalization layer (PCEN) that parametrizes power normalization as well as the compression step, which is typically handled by a static log transform.

Lookahead convolutions have been proposed for streaming inference by Wang et al., Lookahead convolution layer for unidirectional recurrent neural networks, 2016b. Latency constrained Bidirectional recurrent layers (LC-BRNN) and Context sensitive chunks (CSC) have also been proposed by Chen and Huo (*Training deep bidirectional LSTM acoustic model for LVCSR by a context-sensitive-chunk BPTT approach*, IEEE/ACM Transactions on Audio, Speech, and Language Processing, 24(7):1185-1193, 2016) for tractable sequence model training but not explored for streaming inference. Time delay neural networks (by Peddinti et al., *A time delay neural network architecture for efficient modeling of long temporal contexts*, INTERSPEECH, pages 3214-3218, 2015) and Convolutional networks are also options for controlling the amount of future context.

Alternatives have been proposed to relax the label independence assumption of the CTC loss-Attention models (by Bandanau et al., *Neural machine translation by jointly learning to align and translate*, 3rd International Conference on Learning Representations (ICLR2015); and by Chan et al., *Listen, attend and spell: A neural network for large vocabulary conversational speech recognition*, 2016 IEEE International Conference on Acoustics, Speech and Signal Processing (ICASSP)), global normalization (by Collobert et al., *Wav2letter: an end-to-end ConvNet-based Speech Recognition System*, arXiv preprint arXiv:1609.03193, 2016) and segmental RNNs (by Lu et al., *Segmental recurrent neural networks for end-to-end speech recognition*, INTERSPEECH, 2016) and more end-to-end losses like lattice free MMI (Maximum Mutual Information) (by Povey et al., *Purely Sequence-Trained Neural Networks for ASR Based on Lattice-Free MMI*, INTERSPEECH, 2016).

CTC model training has been shown to be made more stable by feeding shorter examples first, like SortaGrad (by Amodei et al., *Deep Speech 2: End-to-end speech Recognition in English and Mandarin*, arXiv preprint arXiv: 1512.02595, 2015) and by warm-starting CTC training from a model pre-trained by Cross-Entropy (CE) loss (using alignment information) (by Sak et al., *Fast and Accurate Recurrent Neural Network Acoustic Models for Speech Recognition*, arXiv preprint arXiv:1507.06947, 2015). SortaGrad additionally helps to converge to a better training error.

C. Embodiments in Input Modeling

Figure 2:
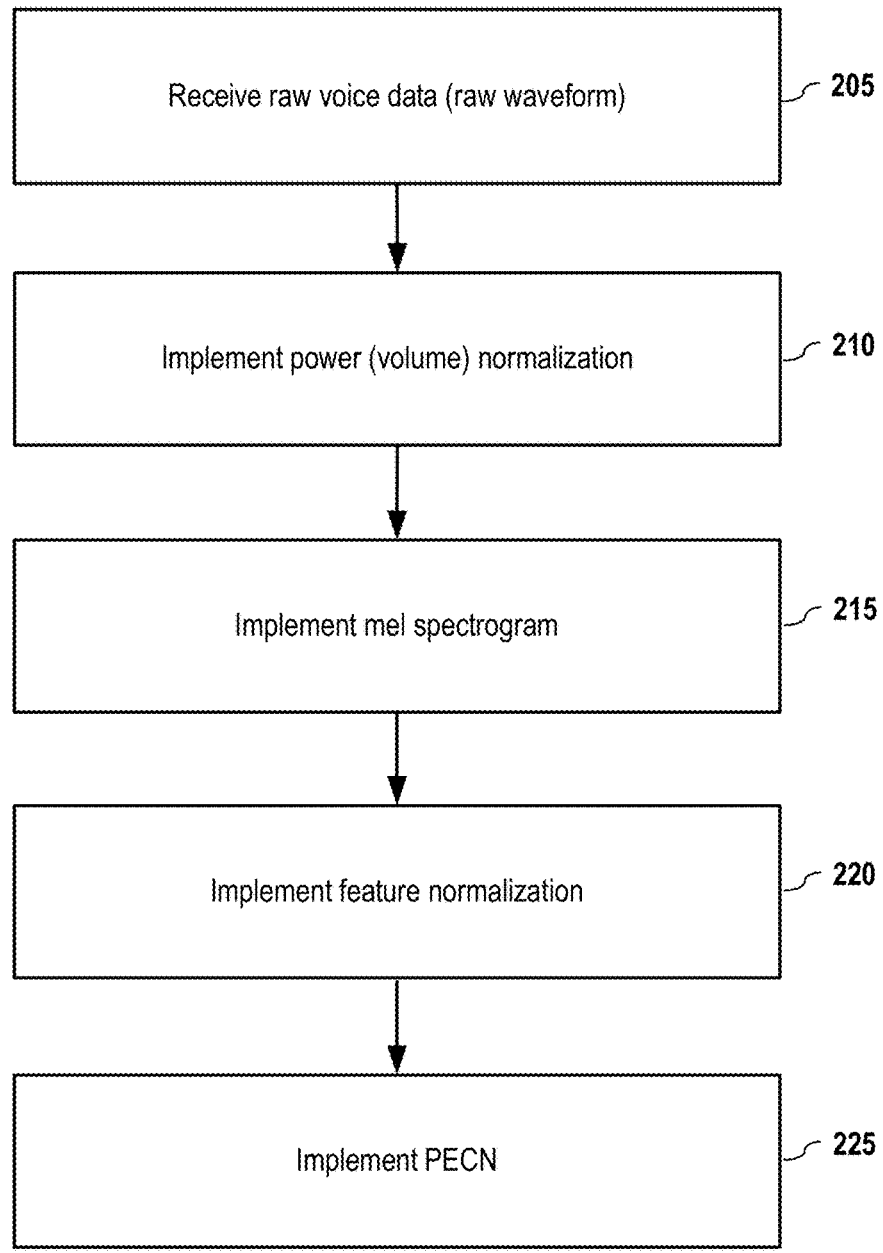
FIG. 2 depicts a process for input modeling with PCEN normalization, according to embodiments of the present document.

ASR systems often have a vital front-end that involves power normalization, mel spectrogram calculation followed by log compression, mean and variance normalization apart from other operations. This section shows that, in embodiments, a wide variety of speech input can be better modeled by replacing this workflow with a trainable frontend. FIG. 2 depicts a process for input modeling with PCEN normalization, according to embodiments of the present document. Raw voice data are received in step 205. Power (volume) normalization, mel spectrogram and feature normalization are implemented in steps 210, 215 and 220 respectively. In step 225, a trainable per-channel energy normalization (PCEN), instead of a log compression, is implemented.

While spectrograms strike an excellent balance between compute and representational quality, they have a high dynamic range (FIG. 1) and are susceptible to channel effects such as room impulse response, Lombard effects and background noises. To alleviate the first issue, they are typically log compressed, and then mean and variance normalized. However, this only moderately helps with all the variations that can arise in the real world as described before, and the network is expected to learn to be robust to these effects by exposing it to such data. By relieving the network of the task of speech and channel normalization, it can devote more of its capacity for the actual speech recognition task. In embodiments, the traditional log compression and power normalization steps are replaced with a trainable PCEN front-end, which performs:

$$y(t, f) = \left(\frac{x(t, f)}{(\varepsilon + M(t, f))^\alpha} + \delta\right)^r - \delta^r \quad (1)$$

where x is the input spectrogram, M is the causal energy estimate of the input, and $\delta$, $\alpha$, $r$, $\varepsilon$ are tunable per-channel parameters. The motivation for this is two-fold. It first normalizes the audio using the automatic gain controller (AGC), $x/M^\alpha$, and further compresses its dynamic range using $(\cdot+\delta)^r-\delta^r$. The latter is designed to approximate an optimized spectral subtraction curve which helps to improve robustness to background noises. Clearly, FIG. 1 shows that PCEN effectively normalizes various speaker and channel effects.

Figure 3A:
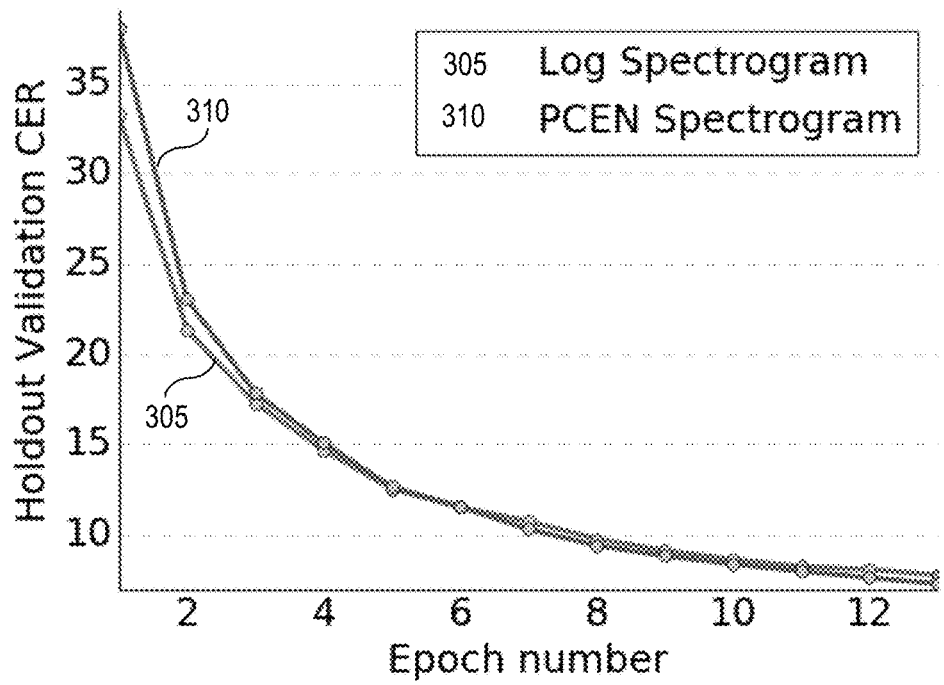
FIG. 3 depicts normalization bias of log compression with FIG. 3A corresponding to homogeneous speech data set and FIG. 3B corresponding to inhomogeneous real-world dataset that is distorted with various channel and acoustical effects, according to embodiments of the present document.
Figure 3B:
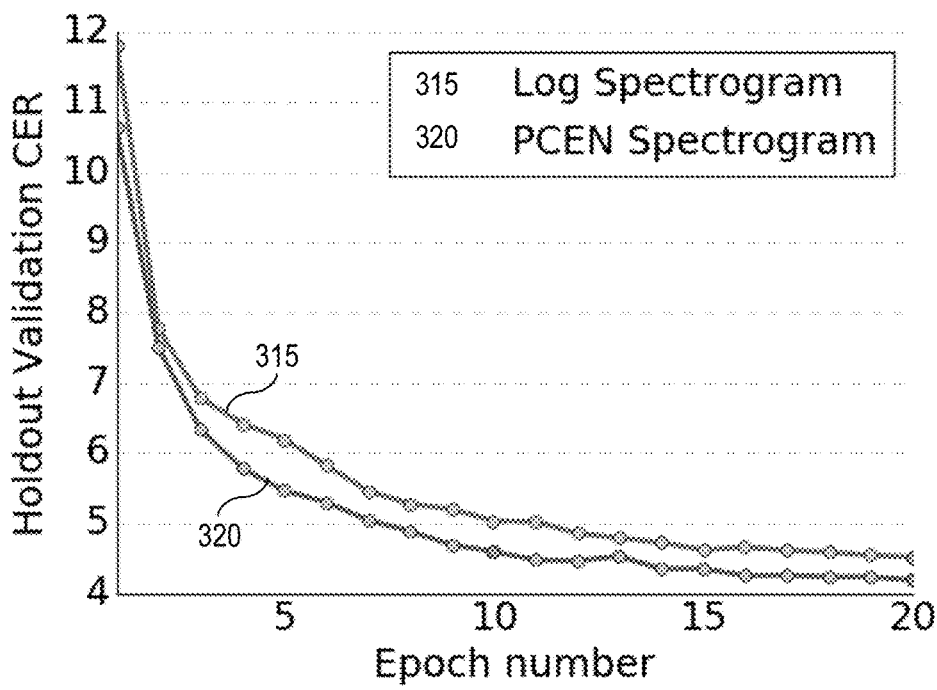

PCEN was originally motivated to improve keyword spotting systems, but experiments in this document show that it helps with general ASR tasks, yielding a noticeable improvement in error rates over the baseline (as shown in Table 3). The training data set which was curated in-house consists of speech data collected in multiple realistic settings. The PCEN front-end gave the most improvement in the far-field validation portion where there was an absolute ~2 WER reduction. To demonstrate that this was indeed reducing bias, it was tried on WSJ, a much smaller and homogeneous dataset. No improvement was observed on the holdout validation set as shown in FIG. 3A as the read speech is extremely uniform and the standard front-end suffices. FIG. 3 depicts holdout validation CERs with log spectrogram (305 and 315) and PCEN spectrogram (310 and 320). FIG. 3B clearly shows the normalization bias of log compression on the inhomogeneous real-world dataset 315, which is distorted with various channel and acoustical effects.

D. Embodiments in Latency Controlled Recurrent Layers

Considering a typical use-case for ASR systems under deployment, audio is typically sent over the network in packets of short durations (e.g., 50-200 ms). Under these streaming conditions, it is imperative to improve accuracy and reduce the latency perceived by end-users. It's observed that users tend to be most perceptive to the time between when they stop speaking and when the last spoken word presents to them. As a proxy for perceived latency, last-packet-latency, defined as the time taken to return the transcription to the user after the last audio packet arrived at the server, was measured. In embodiments, real-time-factor (RTF) has also been commonly used to measure the speed of an ASR system, but it is in most cases only loosely correlated with latency. While a RTF<1 is necessary for a streaming system, it's far from sufficient. As one example RTF does not consider the non-uniformity in processing time caused by (stacked) convolutions in neural networks.

Figure 4:
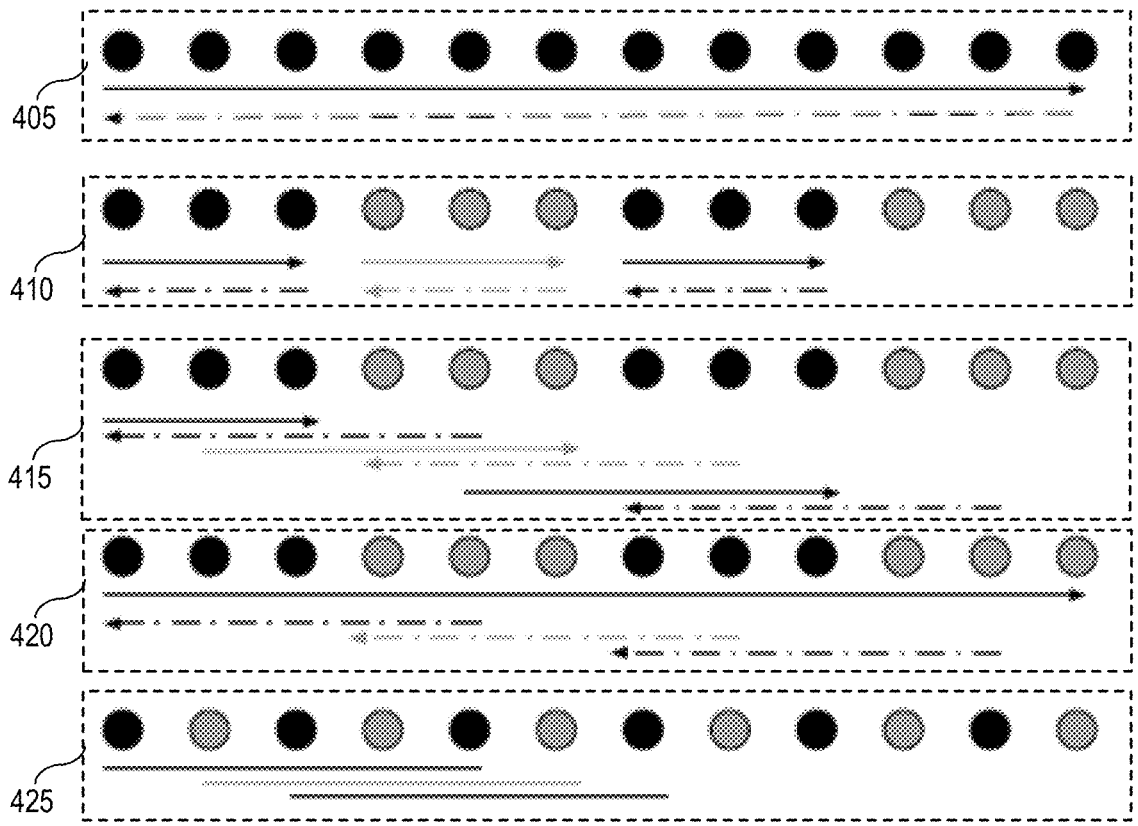
FIG. 4 depicts contexts of different structures, according to embodiments of the present document.

In embodiments, to tackle the bias induced by using purely forward only recurrences in deployed models, several structures are examined. The structures are illustrated in FIG. 4, which includes Bidirectional RNN 405, Chunked RNN 410, Chunked RNN with overlapping 415, and latency-controlled bidirectional RNNs (in the case of this document, LC-BGRU 420 as the recurrent layers employ GRU cells) and lookahead convolutions (LA-Cony) 425. In FIG. 4, solid arrows represent forward recurrences, dash arrows represent backward recurrences, and solid lines represent convolution windows. Furthermore, states are reset to zero at the start of each arrow.

An LA-Cony layer learns a linear weighted combination (convolution) of activations in the future ([t+1,t+C]) to compute activations for each neuron t, with a context size C, as shown in 425. The LA-Cony is placed above all recurrent layers.

Figure 5:
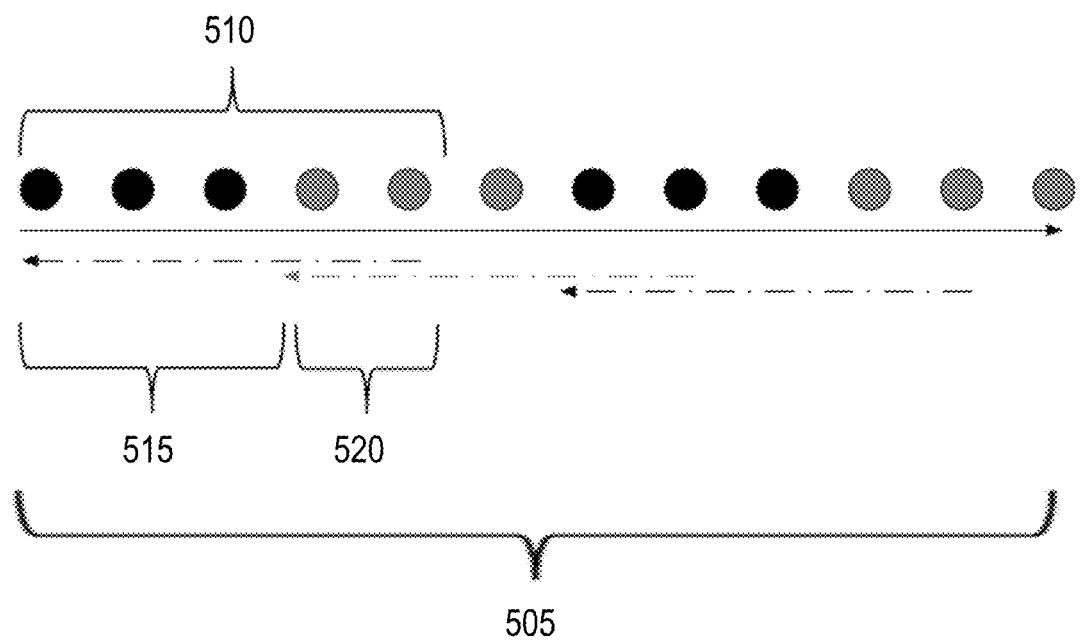
FIG. 5 depicts a detailed context view of Latency Constrained Bidirectional GRU (LC-BGRU), according to embodiments of the present document.

FIG. 5 depicts a detailed context view of a LC-BGRU. In embodiments, in a LC-BGRU layer, an utterance 505 is uniformly divided into several overlapping chunks 510, each of which can be treated as an independent utterance and computed with bidirectional recurrences. Each chunk 510 may comprise a first section 515 with a predetermined time steps and a section of lookahead 520.

Figure 6:
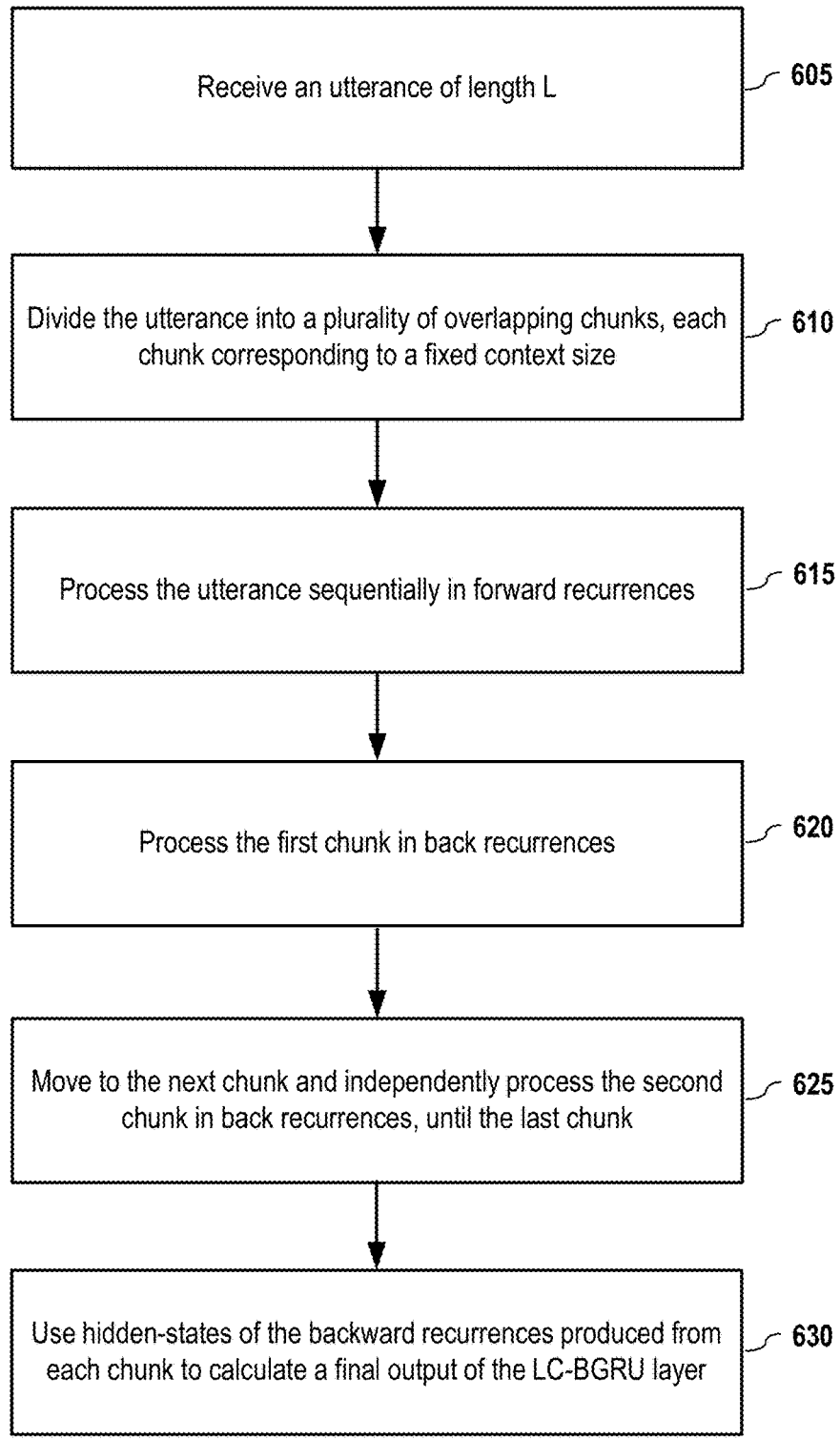
FIG. 6 depicts a process for speech recognition with LC-BGRU structure, according to embodiments of the present document.

FIG. 6 depicts a process for a speech recognition model with LC-BGRU structure, according to embodiments of the present document. Details of the model structure may be referred to FIG. 11. In step 605, an utterance X with length L is received. $x_i$ represents the $i^{th}$ frame of X. In step 610, X is divided into overlapping chunks that are each of a fixed context size $c_W$. The chunks are divided uniformly and each chunk has an overlapped step size $c_S$ less than the fixed context size $c_W$. In step 615, the forward recurrences process X sequentially as $x_1, \ldots, x_L$. Backward recurrences start processing (620) the first chunk $x_1, \ldots, x_{c_W}$, then move (625) ahead by chunk/step-size $c_S$ (a number less than $c_W$) to independently process the second chunk $x_{c_S}, \ldots, x_{c_W+c_S}$, and so on (until the last chunk). In relation to the first chunk $x_1, \ldots, x_{c_W}$, $x_{c_S}, \ldots, x_{c_W+c_S}$ are referred as the lookahead. Hidden-states $h_b$ of the backward recurrences are reset between each chunk, and consequently $h_{b_1}, \ldots, h_{b_{c_S}}$ produced from each chunk are used in calculating (630) the final output of the LC-BGRU layer.

FIG. 4 illustrates this operation and compares it with other methods which are proposed for similar purposes. The forward-looking and backward-looking units in this LC-BGRU layer receive the same affine transformations of inputs. It was found that this helps reduce computation and save parameters, without affecting the accuracy adversely. The outputs are then concatenated across features at each time step before being fed into the next layer.

1. Accuracy and Serving Latency

Figure 7B:
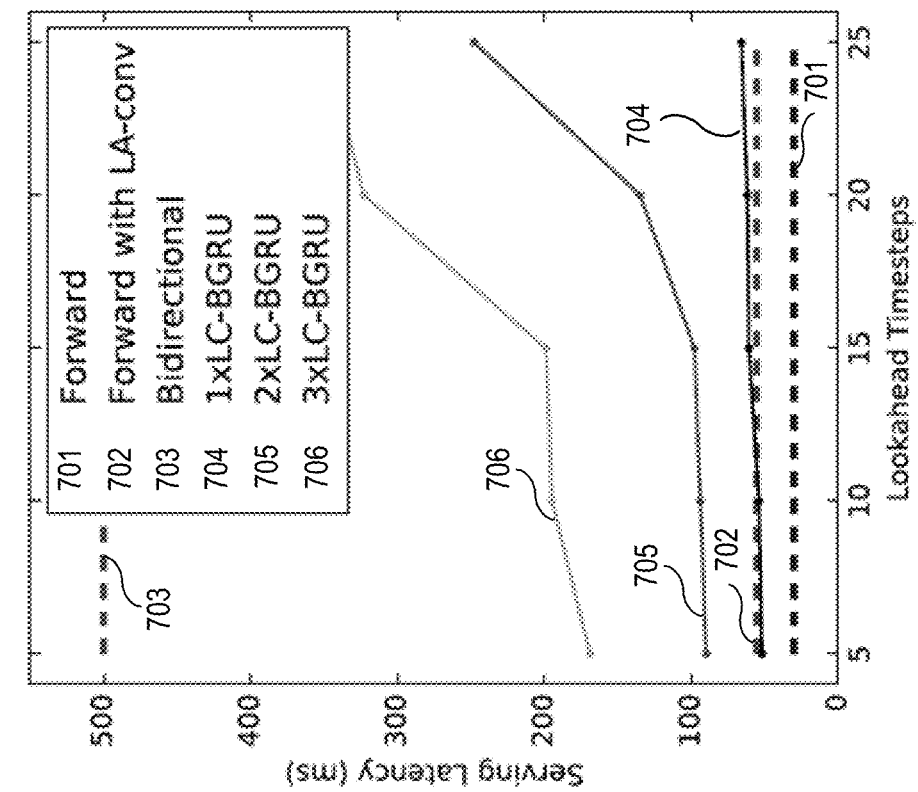
FIG. 7A and FIG. 7B depict Character Error Rate (CER) and serving latency, respectively, on a dev-set as a function of lookahead and the number of LC-BGRU layers, according to embodiments of the present document.
Figure 7A:
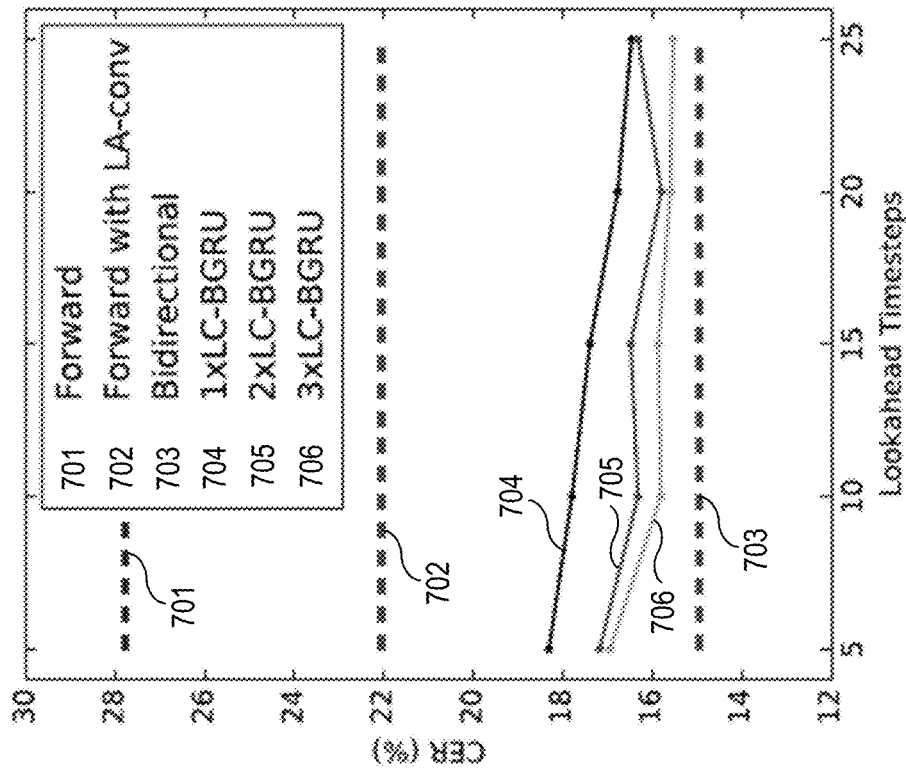

Character Error Rate (CER) and last-packet-latency of using LA-Cony and LC-BGRU are compared, along with those of forward-GRU and Bidirectional GRU for references. In embodiments, context size is fixed as 30 time steps for both LA-Cony and LC-BGRU, and lookahead time step ranges from 5 to 25 every 5 steps for LC-BGRU. For latency experiments, the packet size was fixed at 100 ms, and one packet was sent every 100 ms from the client. 10 simultaneous streams were sent to simulate a system under moderate load. FIGS. 7A and 7B depict Character Error Rate (CER) and serving latency respectively on a dev-set as a function of lookahead and the number of LC-BGRU layers, according to embodiments of the present document. As shown in FIG. 7A, while LA-Cony reduces almost half of the gap between forward GRU and bidirectional GRU, a model with three LC-BGRUs with lookahead of 25 each (yellow line 706) performs as well as bidirectional GRU (green line 703). The accuracy improves, but the serving latency increases exponentially as LC-BGRU layers are stacked, because this increases the effective context much like in convolutional layers. Taking both accuracy and serving-latency into consideration, the final models use 1 LC-BGRU layer, with a lookahead of 20 time steps (400 ms) and step-size of 10 time steps (200 ms). It shall be noted that 1 time step corresponds to 10 ms of the raw-input spectrogram, and then striding in the convolution layers makes that 20 ms.

2. Embodiments of Loading BGRU as LC-BGRU

Since Bidirectional GRUs (BGRU) can be considered as an extreme case of LC-BGRUs with infinite context (as long as the utterance length), it is interesting to explore whether a trained bidirectional GRU model could be loaded as an LC-BGRU, so that LC-BGRUs don't have to be trained from scratch. However, it was found that loading a model with 3 stacked bidirectional GRUs as stacked LC-BGRUs resulted in significant degradation in performance compared to both the bidirectional baseline and a model trained with stacked LC-BGRUs across a large set of chunk sizes and lookaheads.

Figure 8:
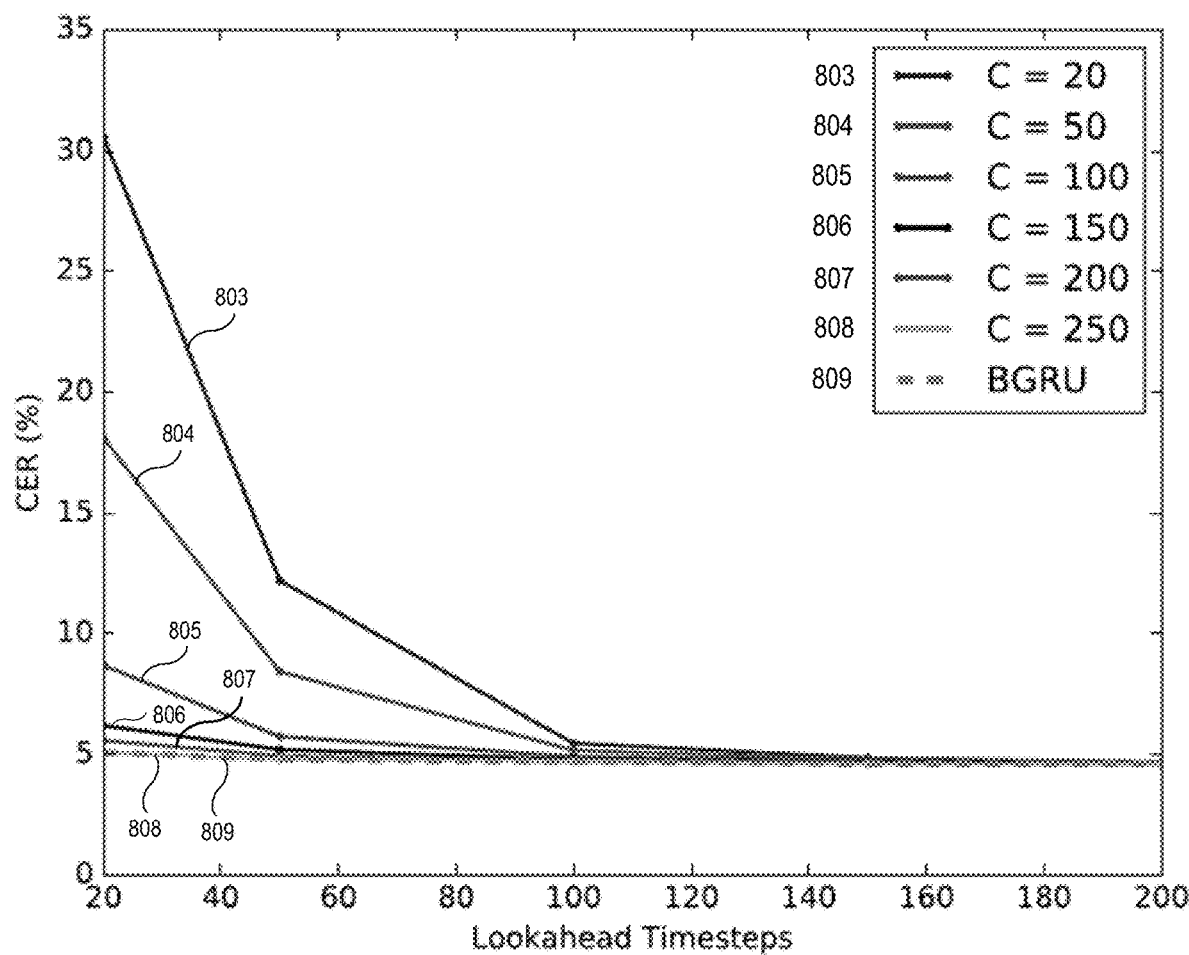
FIG. 8 depicts CER of running Bidirectional Gated Recurrent Unit (BGRU) in a Latency constrained BGRU (LC-BGRU) way with different context sizes (C) and lookahead time steps, according to embodiments of the present document.

In embodiments, the performance of the model can be improved, if the input at each layer is instead chopped up to a fixed size $c_W$, such that it is smaller than the effective context. An LC-BGRU layer is ran on an input of length $c_W$, then the input is strided by $c_S$, the last ($c_W-c_S$) outputs are discarded, and the layer over the strided input is re-ran. Between each iteration the forward recurrent states are copied over, but the backward recurrent states are reset each time. The effect of using various $c_W$ and $c_S$ is shown in FIG. 8. This approach is much more successful in that with $c_W \geq 300$ time steps and $c_S \geq 150$ time steps, being able to obtain nearly identical error rates to the Bidirectional GRU. With this selection of $c_W$ and $c_S$, the network does twice as much computation as would otherwise be needed, and it also has latencies that are unacceptable for streaming applications. However, it does have the advantage of running bi-directional recurrent layers over arbitrarily long utterances in a production environment at close to no loss in accuracy.

E. Loss Function Embodiments

The conditional independence assumption made by CTC forces the model to learn unimodal distributions over predicted label sequences. GramCTC (by Liu et al., *GramCTC: Automatic unit selection and target decomposition for sequence labelling*, arXiv preprint arXiv:1703.00096, 2017, and cross-reference to U.S. patent application Ser. No. 15/698,593, filed on 7 Sep. 2017, entitled "SYSTEMS AND METHODS FOR AUTOMATIC UNIT SELECTION AND TARGET DECOMPOSITION FOR SEQUENCE LABELLING", which is incorporated by reference herein in its entirety) attempts to find a transformation of the output space where the conditional independence assumption made by CTC is less harmful. Specifically, GramCTC attempts to predict word-pieces, whereas traditional CTC based end-to-end models aim to predict characters.

In embodiments, GramCTC learns to align and decompose target sequences into word-pieces, or n-grams. N-Grams allow addressing the peculiarities of English spelling and pronunciation, where word-pieces have a consistent pronunciation, but characters don't. For example, when the model is unsure how to spell a sound, it can choose to distribute probability mass roughly equally between all valid spellings of the sound, and let the language model decide the most appropriate way to spell the word. This is often the safest solution, since language models are typically trained on significantly larger datasets and see even the rarest words. GramCTC is a drop-in replacement for the CTC loss function, with the only requirement being a pre-specified set of n-grams G. In embodiments, all unigrams and high-frequency bi-grams and tri-grams are included, composing a set of 1200 n-grams.

1. Embodiments of Forward-backward Process of GramCTC

The training process of GramCTC is very similar to CTC. The main difference is that multiple consecutive characters may form a valid gram. Thus, the total number of states in the forward-backward process is much larger, as well as the transition between these states.

Figure 9:
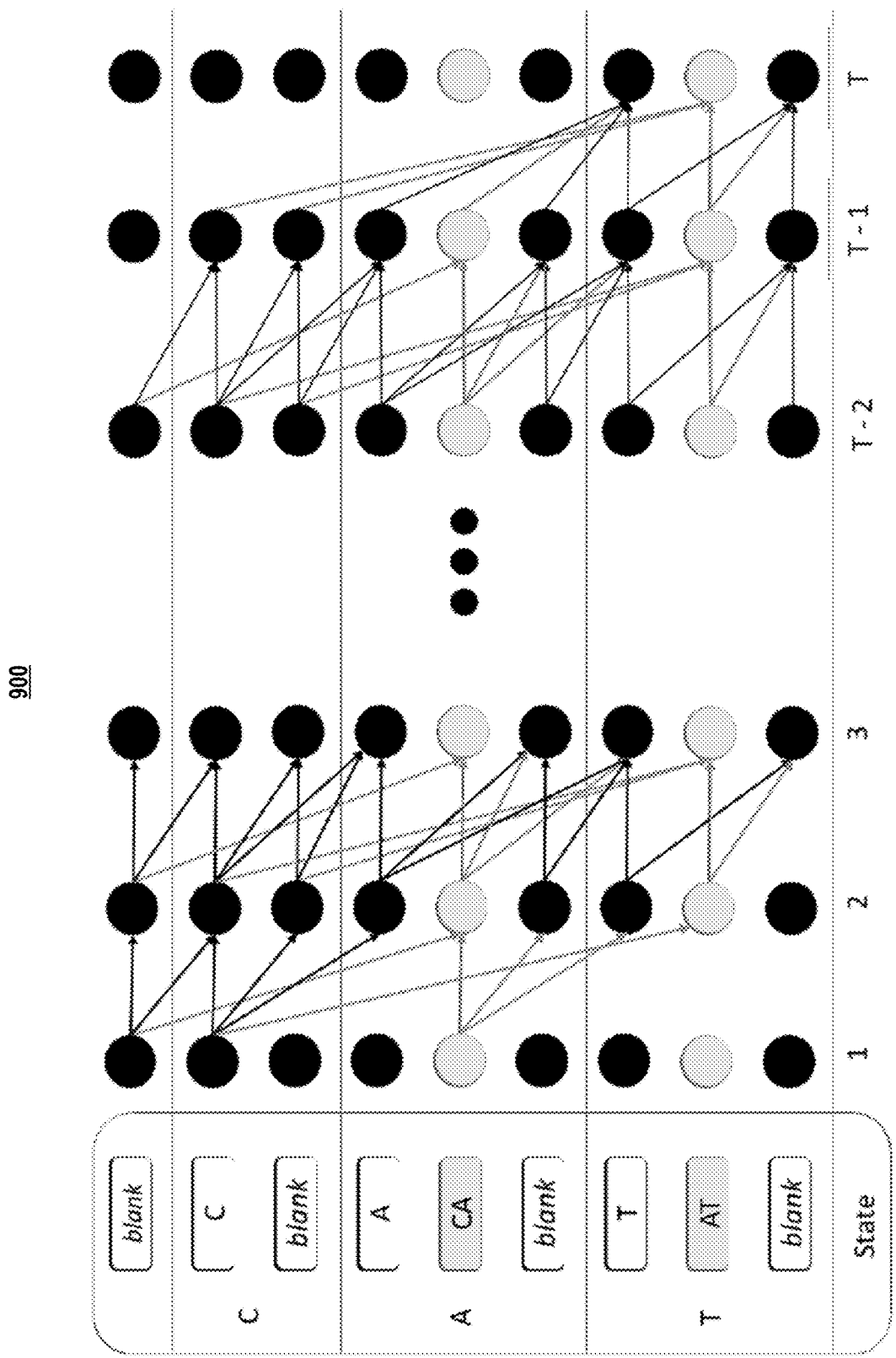
FIG. 9 depicts the states and the forward-backward transitions for the label 'CAT', according to embodiments of the present document.

FIG. 9 illustrates partially the dynamic programming process for the target sequence 'CAT'. Here it is supposed that G contains all possible uni-grams and bi-grams. Thus, for each character in 'CAT', there are three possible states associated with it: 1) the current character, 2) the bi-gram ending in current character, and 3) the blank after current character. There is also one blank at beginning. In total there are 10 states.

2. GramCTC vs CTC

GramCTC effectively reduces the learning burden of ASR network in two ways: 1) it decomposes sentences into pronunciation-meaningful n-grams, and 2) it effectively reduces the number of output time steps. Both aspects simplify the rules the network needs to learn, thus reducing the required network capacity of the ASR task. Table 1 compares the performances between CTC and GramCTC using the same network. There are some interesting distinctions. First, the CERs of GramCTC are similar or even worse than CTC; however, the WERs of GramCTC are always significantly better than CTC. This is probably because Gram-CTC predicts in chunks of characters and the characters in the same chunk are dependent, thus more robust. Secondly, it was also observed that the performance on the dev set is relatively worse than that on the train holdout. The dev dataset is not drawn from the same distribution of the training data—this exhibits the potential for GramCTC to overfit even a large dataset.

Table 2 compares the training efficiency and the performance of trained model with GramCTC on two time resolutions, 2 and 4. By striding over the input at a faster rate in the early layers, the time steps of later layers are effectively reduced, and the training time is reduced in half. From stride 2 to stride 4, the performance also improves a lot probably because larger n-grams align with larger segments of utterance, and thus need lower time resolution.

TABLE 1

Comparison of CTC and GramCTC

| Loss | Train | | Train Holdout | | Dev | |
| --- | --- | --- | --- | --- | --- | --- |
| | CER | WER | CER | WER | CER | WER |
| CTC | 4.38 | 12.41 | 4.60 | 12.89 | 11.64 | 12.41 |
| Gram CTC | 4.33 | 10.42 | 4.66 | 11.37 | 12.03 | 27.1 |

TABLE 2

Performances and training efficiency of GramCTC with different model strides

| Loss | WER | | Epoch Time (hours) | |
| --- | --- | --- | --- | --- |
| Stride | 2 | 4 | 2 | 4 |
| Gram CTC | 21.46 | 18.27 | 18.3 | 9.6 |

F. Optimization Embodiments

Removing optimization issues has been a reliable way of improving performance in deep neural networks. In embodiments, several optimization methods have been explored especially for training recurrent networks. LayerNorm, Recurrent batch norm, and Norm-Prop were tried without much success. Additionally, special care is taken to optimize layers properly, and SortaGrad is also employed.

CTC training could be suffering from optimization issues. In embodiments, by providing alignment information during training, CTC training could be made more stable. This section studies how alignment information can be used effectively.

1. Embodiments of Forward-backward Process of GramCTC

Figure 10:
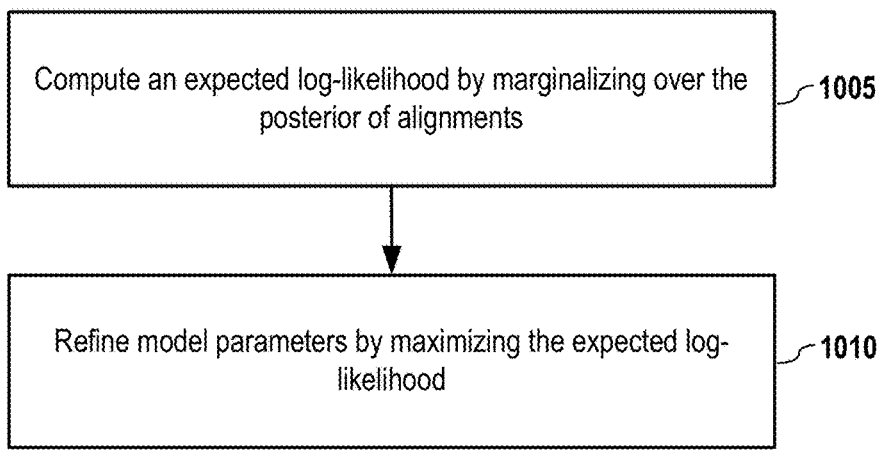
FIG. 10 depicts processes for an Expectation-Maximization (EM) approach to train a GramCTC model, according to embodiments of the present document.
Figure 11:
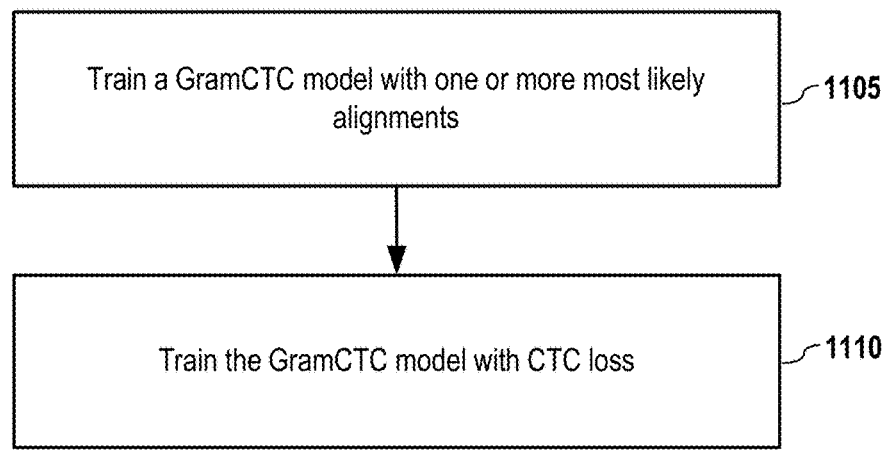
FIG. 11 depicts processes for an alternative approach to train a GramCTC model, according to embodiments of the present document.

Using alignment information for training CTC models appears counter intuitive since CTC marginalizes over all alignments during training. However, the CTC loss is hard to optimize because it simultaneously estimates network parameters and alignments. In embodiments, to simplify the problem, an Expectation-Maximization (EM) like approach, as shown in FIG. 10, to train a GramCTC model is proposed. In step 1005, an expected log-likelihood is computed in the E-step, by marginalizing over the posterior of alignments; in step 1010, the model parameters are refined in the M-step by maximizing the expected log-likelihood. However, it is infeasible to compute the posterior for all the alignments, and it is approximated by taking only the most probable alignment. One step of EM can be considered as the pre-training approach of using alignment information. FIG. 11 depicts processes for an alternative approach to train a GramCTC model, according to embodiments of the present document. In step 1105, the GramCTC model is first trained with one or more most likely alignments (which simplifies training with a Cross-Entropy (CE) loss for a few epochs), followed by training with the CTC loss in step 1110.

In embodiments, using the alignment information, a single model is trained simultaneously using a weighted combination of the CTC loss and the CE loss. In embodiments, the CTC loss and the CE loss has equal weight.

Figure 12B:
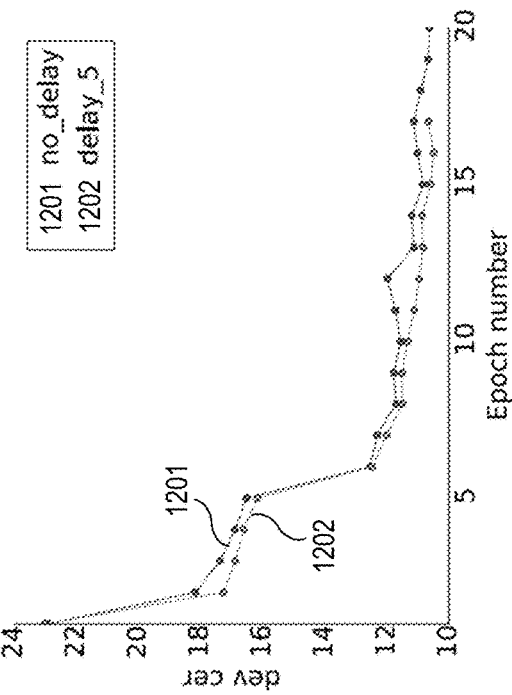
FIG. 12B depicts CER on dev set at various epoch numbers with alignments applied from a bidirectional model to the pre-training of a forward model, according to embodiments of the present document.
Figure 12D:
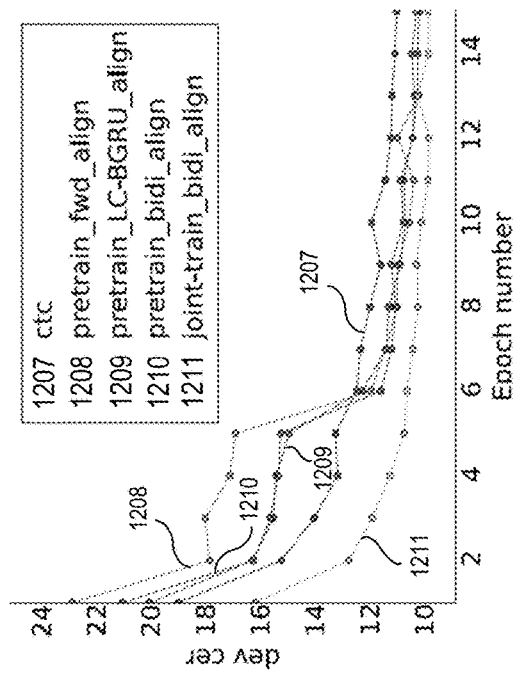
FIG. 12D depicts CER on dev set for the models trained in the LC-BGRU model in FIG. 12C, according to embodiments of the present document.
Figure 12A:
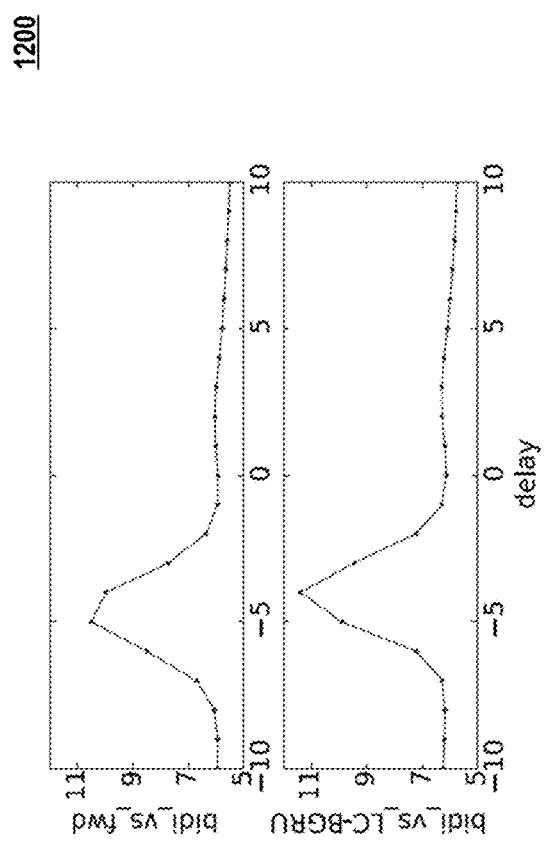
FIG. 12A depicts cross correlation between alignments estimated by three reference models forward, LC-BGRU and bidirectional, according to embodiments of the present document.
Figure 12C:
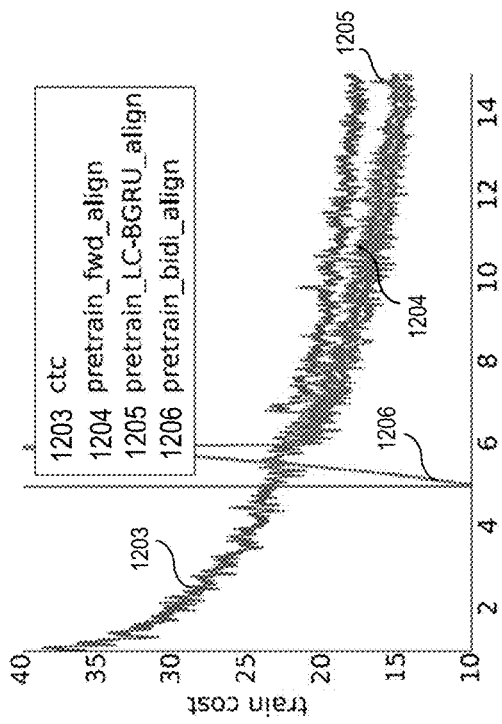
FIG. 12C depicts training cost at various epoch numbers, by warm-starting a LC-BGRU model from pre-training using different alignments, according to embodiments of the present document.

FIG. 12C shows the training curves of the same model architecture with pure CTC training, pre-training and joint training with alignment information from different source models. In the case of pre-training, alignment information is not provided at the 6-th epoch, corresponding to the shift in the training curve. It was shown that the final training losses of both pre-trained and joint-trained models are all lower than the pure CTC trained model, showing the effectiveness of this optimization trick. Additionally, joint-training and pre-training are on par in terms of training, so joint-training is preferred to avoid multi-phase training. The corresponding CER on dev set is presented in FIG. 12D.

2. Source of Alignments

It is important to understand how accurate the alignment information needs to be, since different models have differing alignments according to the architecture and training methods.

Alignments are estimated from three "reference" models (models with forward only GRU, LC-BGRU and bidirectional GRU layers, all trained with several epochs of CTC minimization), and present the cross correlation between the alignments produced by these models in FIG. 12A. The location of the peak implies the amount of delays between two alignments. It is evident that alignments by a forward (and LC-BGRU) model are 5 (or 4) time-steps later than those by a bidirectional model. Therefore, it seems important to pre-train a model with properly adjusted alignments, e.g., alignments from a bidirectional model are supposed to be delayed for 5 steps to be used in the pre-training of a forward model. However, it is found that for models trained on large datasets, this delay has little impact on the final result (as shown in FIG. 12B). To push this series of experiments to the extreme, a model was pre-trained with random alignments. It was found that most likely alignment as predict by any CTC model was sufficient to achieve improved optimization.

G. Some Experiments

It shall be noted that these experiments and results are provided by way of illustration and were performed under specific conditions using a specific embodiment or embodiments; accordingly, neither these experiments nor their results shall be used to limit the scope of the disclosure of the current patent document.

1. Setup

In all experiments, the dataset is 10,000 hours of labeled speech from a wide variety of sources. In embodiments, the dataset is expanded by noise augmentation—in every epoch, 40% of the utterances are randomly selected and background noise is added. For robustness to reverberant noise encountered in far-field recognition, room impulse response (RIR) augmentation is adopted, in which case, a subset of the data is randomly sampled and each instance is convolved with a random RIR signal. RIRs are collected by emitting a signal from a speaker and capturing the signal, as well as the reverberations from the room, using an linear array of 8 microphones. The speaker is placed in a variety of configurations, ranging from 1 to 3 meters distance and 60 to 120 degrees inclination with respect to the array, for 20 different rooms.

Figure 13:
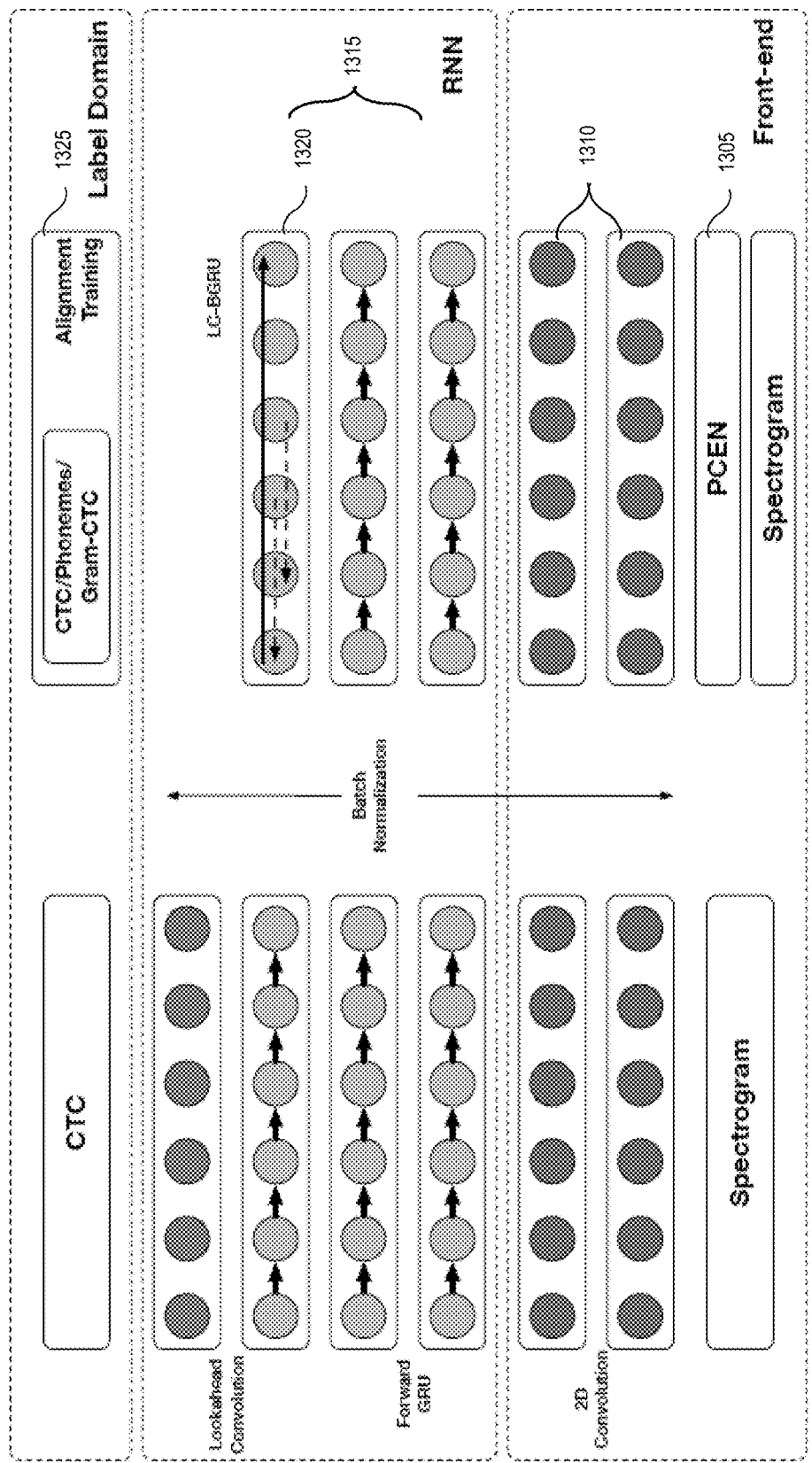
FIG. 13 depicts a comparison between a baseline architecture and a proposed model architecture, according to embodiments of the present document.

FIG. 13 depicts a comparison between a baseline architecture (left column) and a new model architecture (right column), according to embodiments of the present document.

The model specification and training procedure are the same as a Deep Speech 2 model (by Amodei, et al., *Deep speech 2: End-to-end speech recognition in English and Mandarin*, arXiv:1512.02595, 2015 and cross-reference to U.S. patent application Ser. No. 15/358,102, filed on 21 Nov. 2016, entitled "END-TO-END SPEECH RECOGNITION", and U.S. patent application Ser. No. 15/358,083, filed on 21 Nov. 2016, entitled "DEPLOYED END-TO-END SPEECH RECOGNITION", each of which is incorporated by reference herein in its entirety). As shown in FIG. 13, the baseline model (left column) is a deep recurrent neural network with two 2D convolutional input layers, followed by 3 forward Gated Recurrent layers, 2560 cells each, a lookahead convolution layer and one fully connected layer before a softmax layer. The network is trained end-to-end to predict characters using the CTC loss. The configurations of the 2D convolution layers (filters, filter dimensions, channels, stride) are (32, 41×11, 1, 2×2) and (32, 21×11, 32, 2×1). Striding in both time and frequency domains helps reduce computation in the convolution layers. In the convolution and fully-connected layers, batch-normalization is applied before applying nonlinearities (ReLU). Sequence-wise batch-normalization (cross-reference to U.S. patent application Ser. No. 15/358,102, filed on 21 Nov. 2016, entitled "END-TO-END SPEECH RECOGNITION", and U.S. patent application Ser. No. 15/358,083, filed on 21 Nov. 2016, entitled "DEPLOYED END-TO-END SPEECH RECOGNITION", each of which is incorporated by reference herein in its entirety) is used in the recurrent layers, effectively acting on the affine transformations of the inputs fed into them.

For the baseline model, log spectrogram features are extracted, in 161 bins with a hop size of 10 ms and window size of 20 ms, and are normalized so that each input feature has zero mean and unit variance. The optimization method used is stochastic gradient descent with Nesterov momentum. Hyperparameters (batch-size=512, learning-rate $7\times10^{-4}$, momentum 0.99) are kept the same across different experiments.

FIG. 13 also shows the architecture for the new model (right column). The model comprises a PCEN layer 1305 to process the spectrogram of an audio input, one or more 2D convolutional input layers 1310, followed by a recurrent neural network (RNN) 1315. The RNN comprises one or more Gated Recurrent layers 1320. In embodiments, at least one of the Gated Recurrent layers 1320 is a LC-BGRU layer. Details of the LC-GBRUs are discloses in previous sections, including Section D and FIGS. 4-6. The new model is trained end-to-end to predict characters in the CTC loss layer 1325. The aforementioned CTC, Gram-CTC, and/or alignment training may be implemented for the CTC loss. In embodiments, approaches applicable in the deep speech 2 model, such as striding in time and frequency domains, sequence-wise batch-normalization in the GRU layers and/or convolution layers, are also applicable to the new model.

Table 3 shows the result of the proposed solutions in earlier sections. The results are reported on a sample of the train set as well as a development set. The error rates on the train set are useful to identify over-fitting scenarios, especially since the development set is significantly different from the training distribution in this document as their sources are different.

In Table 3, both character and word error rates (CER/WER) are produced using a greedy max decoding of the output softmax matrix, i.e., taking the most likely symbol at each time step and then removing blanks and repeated characters. However, when a language model is adopted as in the "Dev LM" results, a beam search is used over the combined CTC and LM scores.

2. Some Results of Individual Changes

The first half of Table 3 shows the impact of each of the changes applied individually. All of the techniques proposed help fit the training data better, measured by CER on the train set. The following observations were noticed.

Replacing CTC loss with GramCTC loss achieves a lower WER, while CERs are similar on the train set. This indicates that the loss promotes the model to learn the spelling of words, but completely mis-predicts words when they are not known. This effect results in diminished improvements when the language model is applied.

Applying farfield augmentation on the same sized model results in a worse training error as expected. It shows a marginal improvement on the dev set, even though the dev set has a heavy representation of farfield audio.

The single biggest improvement on the dev set is the addition of the LC-BGRU which closes the gap to bidirectional models by 50%.

Joint (and pre) training with alignment information improves CER on the train set by 25%, high-lighting optimization issues in training CTC models from scratch. However, these models get less of an improvement from language model decoding, indicating their softmax outputs could be overconfident, therefore less amenable to correction by the language model. This phenomenon is observed in all models employing CE training as well as the Bidirectional target model (the model that provides the targets used for CE training).

3. Some Results of Incremental Changes

While the solutions are designed to address distinct issues in the model, it should not be expected every individual improvement to be beneficial when used in combination. As an example, it is seen in the section of optimization that models with bidirectional layers gain very little by using alignment information—clearly, bidirectional layers by themselves address a part of the difficulty in optimizing CTC models. Therefore, addressing the absence of bidirectional layers will also address optimization difficulties and they may not stack up.

It can be seen in the second half of Table 3 that improvements indeed do not stack up. The following 3 interesting models were discussed.

1. The model mix of joint training with 3 increasingly difficult losses (CE, CTC, and GramCTC, Mix-1) achieves the best results on the train set far surpassing the other model mixes, and even nearly matching the performance of models with bidirectional layers on the train set. This model has the smallest gain on the dev set amongst all the mix-models, and puts it in the overfitting regime. It is known that there exists a model that can generalize better than this one, while achieving the same error rates on the train set: the bidirectional baseline. Additionally, this model receives a weak improvement from the language model, which agrees with what was observed with GramCTC and CE training in Section G.2.

2. The model mix of PCEN, LC-BGRU and IR augmentation (Mix-2) performs worse on the train set—additional data augmentation with IR impulses makes the training data harder to fit as what have been seen earlier, but PCEN and LC-BGRU is not sufficient to address this difficulty. However, the model does attain better generalization and performs better on the dev set, and actually surpasses the bidirectional target when using a language model.

3. Mix-3 adds CE joint training which helps to address optimization issues and leads to lower error rates on both the train and dev sets. However, the improvement in dev WER disappears when using a language model, again highlighting the language model integration issues when using CE training.

TABLE 3

Results for both single improvements and incremental improvements to the models Except when using a language mode (Dev LM), reported numbers are computed using greedy max decoding as described in Section G.1. Best results using deployable models are bolded.

|  | Train | | DEV | | | | | |
|---|---|---|---|---|---|---|---|---|
|  | CER | WER | CER | % Rel | WER | % Rel | WER | % Rel |
| Baseline | 4.38 | 12.41 | 11.64 | 0.00% | 28.68 | 0.00% | 18.95 | 0.00% |
| Individual-changes | | | | | | | | |
| Baseline + PCEN | 3.79 | 10.90 | 11.16 | 4.20% | 27.85 | 2.90% | 18.12 | 4.40% |
| Baseline + 1x LC-BGRU | 3.49 | 10.33 | 11.06 | 5.00% | 27.03 | 5.80% | 17.47 | 7.80% |
| Baseline + GramCTC | 4.33 | 10.42 | 12.03 | −3.30% | 27.10 | 5.50% | 19.26 | −1.70% |
| Baseline + CE pre-training | 3.31 | 9.50 | 10.84 | 6.90% | 26.39 | 8.00% | 17.89 | 5.60% |
| Baseline + CE joint-training | 3.25 | 9.58 | 10.75 | 7.70% | 26.64 | 7.10% | 17.93 | 5.40% |
| Baseline + Farfield augmentation | 5.25 | 14.59 | 11.49 | 1.30% | 29.64 | −3.30% | 18.47 | 2.50% |
| Incremental-changes | | | | | | | | |
| Baseline + CE + CTC + GramCTC joint training (Mix-1) | 2.97 | 7.31 | 10.91 | 6.30% | 24.48 | 14.60% | 17.71 | 6.5% |
| Baseline + PCEN + 1x LC-BGRU +Farfield augmentation (Mix-2) | 5.51 | 14.10 | 9.74 | 16.40% | 24.82 | 13.40% | 15.47 | 18.40% |
| +CE joint training (Mix-3) | 3.57 | 10.50 | 9.38 | 19.40% | 23.77 | 17.10% | 15.75 | 16.90% |
| Bidirectional target | 2.58 | 7.47 | 9.37 | 19.60% | 23.03 | 19.70% | 15.96 | 15.80% |

TABLE 4

A deeper look into the dev set, measuring WER with language model decoding of each model on different slices of the dev set. Serving latency (milliseconds) is the 98$^{th}$ percentile latency on the last packet as described in Section D. Training time is in hours per epoch with the data and infrastructure the same.
*This model has twice the number of parameters as the Baseline, and suffers from prohibitively large serving latency.

| Devsets | Baseline | Baseline × 2 | Mix-3 |
| --- | --- | --- | --- |
| Clean casual speech | 5.90 | 5.00 | 5.80 |
| Farfield | 35.05 | 30.60 | 26.49 |
| Names | 19.73 | 19.30 | 17.40 |
| Overall | 18.46 | 17.46 | 15.74 |
| Serving latency | 112 | 25933 | 153 |
| Training Time | 17 | 29 | 25 |

Finally in Table 4, Mix-3 is compared against the baseline model, and its equivalent with twice as many parameters in every layer, on various categories of speech data. Clearly, Mix-3 is significantly better for "farfield" and "Names" speech data, two notably difficult categories for ASR. ASR tasks run into a generalization issue for "Names" categories because they are often required words that is not present in the acoustic training data. Similarly, far field audio is hard to obtain and the models are forced to generalize out of the training data, in this case by making use of augmentation. At the same time, the serving latency of Mix-3 is only slightly higher than baseline model, still good for deployment.

H. Some Results

In this work, multiple sources of bias are identified in end-to-end speech systems which tend to encourage very large neural network structure, thus make deployment impractical. Multiple methods are presented to address these issues, which enable building a model that performs significantly better on the target development set, while still being good for streaming inference.

In embodiments, while the addition of cross entropy alignment training and the GramCTC loss allow models to fit the training and validation data better with respect to the WER of a greedy max decoding, they see much less of a benefit from language modeling integration. In embodiments, using an LC-BRGU layer in place of lookahead convolutions conveys benefits across the board as does use of a PCEN layer at the front end. Finally, generalization to unseen data is improved by the addition of farfield augmentation.

I. System Embodiments

In embodiments, aspects of the present patent document may be directed to, may include, or may be implemented on one or more information handling systems/computing systems. A computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, phablet, personal digital assistant (PDA), smart phone, smart watch, smart package, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, ROM, and/or other types of memory. Additional components of the computing system may include one or more disk drives, one or more network ports for communicating with external devices as well as various input and output (I/O) devices, such as a keyboard, a mouse, touchscreen and/or a video display. The computing system may also include one or more buses operable to transmit communications between the various hardware components.

Figure 14:
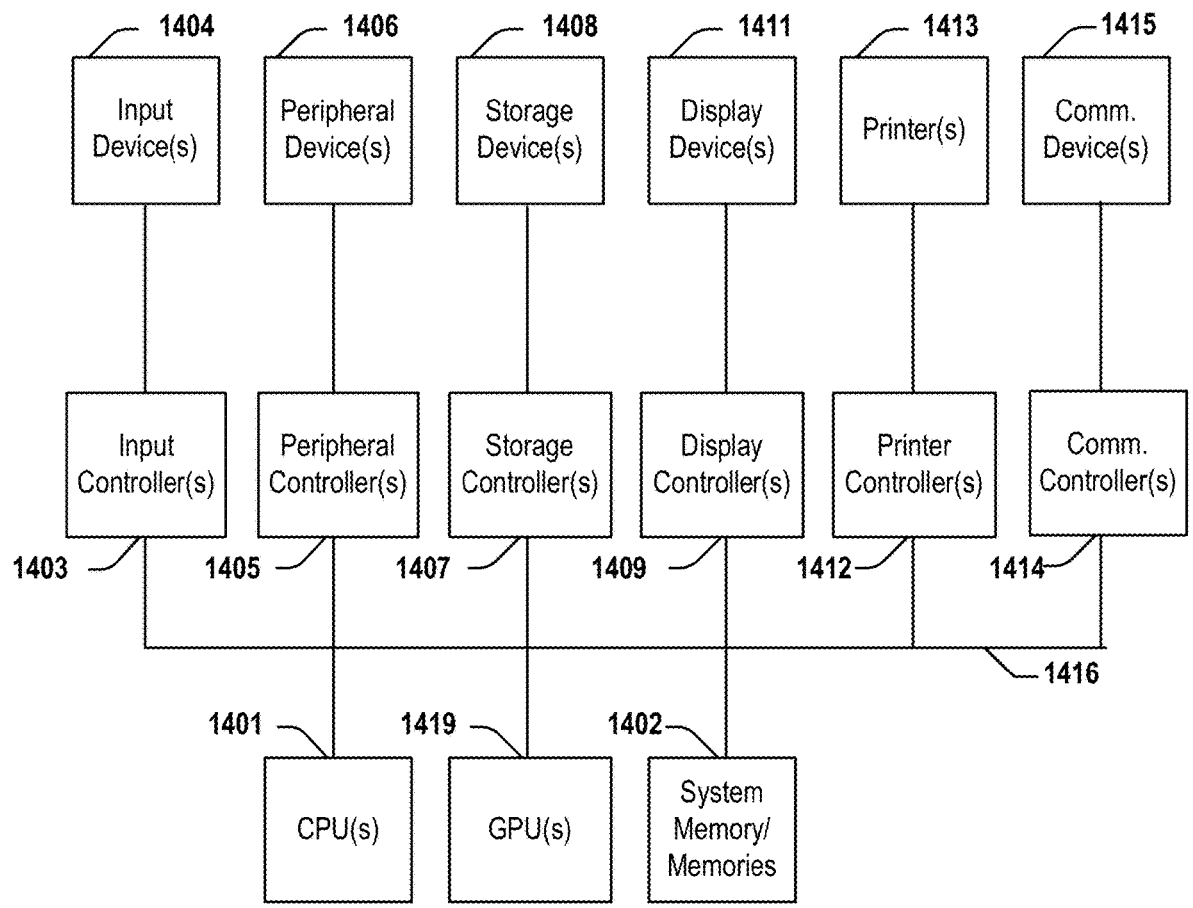
FIG. 14 depicts a simplified block diagram of a computing device/information handling system, in accordance with embodiments of the present document.

FIG. 14 depicts a simplified block diagram of a computing device/information handling system (or computing system) according to embodiments of the present disclosure. It will be understood that the functionalities shown for system 1400 may operate to support various embodiments of a computing system—although it shall be understood that a computing system may be differently configured and include different components, including having fewer or more components as depicted in FIG. 14.

As illustrated in FIG. 14, the computing system 1400 includes one or more central processing units (CPU) 1401 that provides computing resources and controls the computer. CPU 1401 may be implemented with a microprocessor or the like, and may also include one or more graphics processing units (GPU) 1419 and/or a floating-point coprocessor for mathematical computations. System 1400 may also include a system memory 1402, which may be in the form of random-access memory (RAM), read-only memory (ROM), or both.

A number of controllers and peripheral devices may also be provided, as shown in FIG. 14. An input controller 1403 represents an interface to various input device(s) 1404, such as a keyboard, mouse, touchscreen, and/or stylus. The computing system 1400 may also include a storage controller 1407 for interfacing with one or more storage devices 1408 each of which includes a storage medium such as magnetic tape or disk, or an optical medium that might be used to record programs of instructions for operating systems, utilities, and applications, which may include embodiments of programs that implement various aspects of the present invention. Storage device(s) 1408 may also be used to store processed data or data to be processed in accordance with the invention. The system 1400 may also include a display controller 1409 for providing an interface to a display device 1411, which may be a cathode ray tube (CRT), a thin film transistor (TFT) display, organic light-emitting diode, electroluminescent panel, plasma panel, or other type of display. The computing system 1400 may also include one or more peripheral controllers or interfaces 1405 for one or more peripherals 1406. Example of peripheral may include one or more printers, scanners, input devices, output devices, sensors, and the like. A communications controller 1414 may interface with one or more communication devices 1415, which enables the system 1400 to connect to remote devices through any of a variety of networks including the Internet, a cloud resource (e.g., an Ethernet cloud, an Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals.

In the illustrated system, all major system components may connect to a bus 1416, which may represent more than one physical bus. However, various system components may or may not be in physical proximity to one another. For example, input data and/or output data may be remotely transmitted from one physical location to another. In addition, programs that implement various aspects of the invention may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Aspects of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A computer-implemented method for automatic speech recognition comprising:
   receiving an input audio comprising an utterance;
   generating a set of spectrogram frames for the utterance;
   dividing a representation of the utterance related to the set of spectrogram frames into a plurality of chunks that overlap;
   processing the representation of the utterance in forward recurrence in a recurrent neural network (RNN);
   processing at least some of the plurality of chunks in backward recurrence in the RNN; and
   using hidden states of the backward recurrences obtained from at least some of the chunks to calculate a final output of the RNN.

2. The computer-implemented method of claim 1 wherein the plurality of chunks are divided uniformly with each chunk corresponding to a fixed context size.

3. The computer-implemented method of claim 1 wherein backward recurrence starts processing with a first chunk of the plurality of chunks and moves ahead by a chunk step size that is less than a chunk size.

4. The computer-implemented method of claim 1 wherein the hidden states of the backward recurrences are reset between each chunk.

5. The computer-implemented method of claim 1 wherein the RNN comprises one or more gated recurrent unit (GRU) layers.

6. The computer-implemented method of claim 5 wherein the one or more gated recurrent layers comprise at least one Latency Constrained Bidirectional GRU (LC-BGRU) layer to process the plurality of chunks in backward recurrence.

7. The computer-implemented method of claim 1 wherein the set of spectrogram frames for the utterance are used as an input to a per-channel energy normalization (PCEN) process.

8. The computer-implemented method of claim 1 further comprising:
   training the RNN with a cross-entropy (CE) loss for one or more epochs; and
   training the RNN by implementing a Gram Connectionist Temporal Classification (Gram-CTC) loss function in a CTC cost layer using the final output of the RNN.

9. The computer-implemented method of claim 1 wherein the Gram-CTC loss function automatically selects useful grams from a pre-specified set and decomposes an input utterance with the selected grams.

10. The computer-implemented method of claim 9 wherein the pre-specified set comprises uni-grams and selected bi-grams and tri-grams.

11. A computer-implemented method for training a neural network (NN) model for speech transcription, the method comprising:
   inputting an utterance from a training set into the NN model, the NN model comprising one or more convolutional layers and a bidirectional recurrent layer;

generating a representation of the utterance that uses a trainable per-channel energy normalization (PCEN) process;

using bidirectional recurrent layer, processing the representation of the utterance in a forward recurrence and processing at least some of a plurality of chunks of the representation in a backward recurrence fashion to obtain an output of the NN;

obtaining a loss for the NN using the output of the NN and a Connectionist Temporal Classification (CTC) loss function; and using the loss to update at least a portion of the NN.

12. The computer-implemented method of claim 11 wherein the backward recurrence fashion starts processing with a first chunk of the plurality of chunks and moves ahead by a chunk step size that is less than a chunk size.

13. The computer-implemented method of claim 12 wherein the bidirectional recurrent layer comprises a Latency Constrained Bidirectional GRU (LC-BGRU) layer.

14. The computer-implemented method of claim 11 wherein the RNN NN is trained simultaneously using a weighted combination of a CTC loss and a cross-entropy (CE) loss.

15. The computer-implemented method of claim 14 wherein the CTC loss is a Gram-CTC loss, and the Gram-CTC loss and the CE loss have equal weighting factors.

16. A computer-implemented method for speech transcription with a recurrent neural network (RNN), the method comprising:

receiving a set of spectrogram frames correspond to an utterance, dividing a representation of the utterance into a plurality of chunks that overlap, each chunk corresponding to a fixed context size;

processing the representation of the utterance in forward recurrence in one or more gated recurrent unit (GRU) layers within the RNN;

processing at least some of the plurality of chunks in a backwards recurrent fashion in the one or more GRU layers to obtain a plurality of hidden states; and using the obtained hidden states to calculate a final output of the RNN.

17. The computer-implemented method of claim 16 wherein at least some of the chunks of the plurality of chunks are divided uniformly.

18. The computer-implemented method of claim 16 wherein each of the at least some of the plurality of chunks is processed independently in backward recurrence with hidden states reset between each chunk.

19. The computer-implemented method of claim 16 wherein the RNN is deployed for inference in a streaming setting.

20. The computer-implemented method of claim 16 wherein the RNN was trained using a weighted combination of a Gram Connectionist Temporal Classification (CTC) loss and a cross-entropy (CE) loss.

* * * * *